United States Patent
Tachibana et al.

(10) Patent No.: US 11,621,020 B2
(45) Date of Patent: Apr. 4, 2023

(54) MAGNETIC RECORDING MEDIUM

(71) Applicant: SONY CORPORATION, Tokyo (JP)

(72) Inventors: Junichi Tachibana, Miyagi (JP); Takashi Aizawa, Miyagi (JP); Teruo Sai, Miyagi (JP); Noboru Sekiguchi, Miyagi (JP); Tetsuo Endo, Miyagi (JP); Tomoe Ozaki, Miyagi (JP); Ryoichi Hiratsuka, Miyagi (JP)

(73) Assignee: SONY CORPORATION, Tokyo (JP)

( * ) Notice: Subject to any disclaimer, the term of this patent is extended or adjusted under 35 U.S.C. 154(b) by 649 days.

(21) Appl. No.: 16/490,279

(22) PCT Filed: Apr. 6, 2018

(86) PCT No.: PCT/JP2018/014770
§ 371 (c)(1),
(2) Date: Aug. 30, 2019

(87) PCT Pub. No.: WO2018/186493
PCT Pub. Date: Oct. 11, 2018

(65) Prior Publication Data
US 2020/0075051 A1    Mar. 5, 2020

(30) Foreign Application Priority Data

Apr. 7, 2017  (JP) ................ JP2017-077078

(51) Int. Cl.
*G11B 5/667* (2006.01)
*G11B 5/73* (2006.01)
*G11B 5/65* (2006.01)

(52) U.S. Cl.
CPC .............. *G11B 5/667* (2013.01); *G11B 5/653* (2013.01); *G11B 5/656* (2013.01); *G11B 5/737* (2019.05);
(Continued)

(58) Field of Classification Search
CPC ......... G11B 5/667; G11B 5/653; G11B 5/656; G11B 5/7369; G11B 5/737; G11B 5/73;
(Continued)

(56) References Cited

U.S. PATENT DOCUMENTS 10,580,447 B2 * 3/2020 Sekiguchi .............. G11B 5/667
10,789,979 B2 * 9/2020 Tachibana ................ G11B 5/65
(Continued)

FOREIGN PATENT DOCUMENTS

CN         104766613 A      7/2015
DE    602006001037 T2      6/2009
(Continued)

OTHER PUBLICATIONS

International Search Report and Written Opinion of PCT Application No. PCT/JP2018/014770, dated Jun. 5, 2018, 09 pages of ISRWO.
(Continued)

*Primary Examiner* — Holly Rickman
(74) *Attorney, Agent, or Firm* — Chip Law Group

(57) ABSTRACT

A magnetic recording medium includes a flexible and elongated substrate, a soft magnetic layer having an average thickness of 10 nm or more to 50 nm or less, and a recording layer. The soft magnetic layer is disposed between the substrate and the recording layer, and a difference in Young's modulus between the magnetic recording medium and the substrate in a longitudinal direction of the substrate is 2.4 GPa or more.

15 Claims, 5 Drawing Sheets

(52) U.S. Cl.
CPC .......... *G11B 5/7363* (2019.05); *G11B 5/7364* (2019.05); *G11B 5/7369* (2019.05)

(58) Field of Classification Search
CPC ....... G11B 5/78; G11B 5/7334; G11B 5/7371; G11B 5/7368; G11B 5/7373; G11B 5/7377; G11B 5/7379
See application file for complete search history.

(56) References Cited

U.S. PATENT DOCUMENTS

| | | | |
|---|---|---|---|
| 2007/0009769 | A1 | 1/2007 | Kanazawa |
| 2007/0153419 | A1* | 7/2007 | Arai ..................... G11B 5/4555 360/131 |
| 2012/0050908 | A1 | 3/2012 | Ohtsu et al. |
| 2015/0194174 | A1 | 7/2015 | Sekiguchi et al. |
| 2018/0122417 | A1* | 5/2018 | Watanabe ................ G11B 5/65 |

FOREIGN PATENT DOCUMENTS

| | | |
|---|---|---|
| EP | 1742205 A2 | 1/2007 |
| JP | 2002-123934 A | 4/2002 |
| JP | 2002-150540 A | 5/2002 |
| JP | 2007-018624 A | 1/2007 |
| JP | 2012-053940 A | 3/2012 |
| JP | 2015-130214 A | 7/2015 |

OTHER PUBLICATIONS

J. A. Wickert, "Analysis of Self-Excited Longitudinal Vibration of a Moving Tape", Journal of Sound and Vibration (1993), vol. 160, No. 3, Nov. 15, 1990, pp. 455-463.

Jonathan A. Wickert, "Analysis of Self-excited Longitudinal Vibration of a Moving Tape", Journal of Sound and Vibration, vol. 160, No. 3, Jan. 22, 1993, pp. 455-463.

* cited by examiner

20: SPUTTERING DEVICE
22: DRUM
24: DELIVERY REEL
26: EXHAUST PORT
27a to 27c, 28a to 28c: GUIDE ROLLERS
21: DEPOSITION CHAMBER
23a to 23f: CATHODES
25: TAKE-UP REEL

MAGNETIC RECORDING MEDIUM

CROSS REFERENCE TO RELATED APPLICATIONS

This application is a U.S. National Phase of International Patent Application No. PCT/JP2018/014770 filed on Apr. 6, 2018, which claims priority benefit of Japanese Patent Application No. JP 2017-077078 filed in the Japan Patent Office on Apr. 7, 2017. Each of the above-referenced applications is hereby incorporated herein by reference in its entirety.

TECHNICAL FIELD

The present technology relates to a magnetic recording medium.

BACKGROUND ART

In recent magnetic tapes, a width of a data track is getting narrower and narrower due to an increase in recording density. A servo signal that indicates a reference position of a narrow data track is prewritten on a magnetic tape so as to enable a magnetic head to follow the data track accurately. Then, a magnetic tape drive reads the servo signal and calculates a position gap between the magnetic head and the data track which is a subject of recording and reproducing. The magnetic tape drive controls the magnetic head to follow the data track on the basis of the position gap.

A servo writer that writes a servo signal writes the servo signal with a fixed servo signal write head while the magnetic tape runs. At this time, in order to write the servo signal accurately, the magnetic tape is made to run with extremely high positional accuracy so as not to vary in a running direction or a width direction of the magnetic tape. However, in reality, a friction or the like between the servo signal write head and the magnetic tape causes a resonance phenomenon of vibration between the magnetic tape and a guide which are disposed before and behind the servo signal write head. Due to this resonance phenomenon, blurring (fluctuation) of the magnetic tape in the running direction or width direction is unavoidable. Writing a servo signal on the magnetic tape along with such blurring leads to a possibility of degrading tracking servo characteristics of the magnetic tape.

It is known that such a resonance phenomenon occurs at a unique frequency due to stiffness of a magnetic tape (see, for example, Non-Patent Document 1).

CITATION LIST

Non-Patent Document

Non-Patent Document 1: J. A. Wickert, "Analysis of self-excited longitudinal vibration of a moving tape", J. Sound Vibr., vol. 160, no. 3, pp. 455-463, January 1993.

SUMMARY OF THE INVENTION

Problems to be Solved by the Invention

An object of the present technology is to provide a magnetic recording medium having high tracking servo characteristics and a high signal-noise ratio (SNR).

Solutions to Problems

In order to solve the problem, the present technology provides a magnetic recording medium that includes a substrate which is flexible and elongated; a soft magnetic layer having an average thickness of 10 nm or more and 50 nm or less; and a recording layer, in which the soft magnetic layer is disposed between the substrate and the recording layer, and a difference in Young's modulus between the magnetic recording medium and the substrate in a longitudinal direction of the substrate is 2.4 GPa or more.

Effects of the Invention

According to the present technology, there is provided a magnetic recording medium having high tracking servo characteristics and a high SNR. Note that effects described herein are not necessarily limited, and the present technology may produce any of the effects described in the present disclosure or effects different therefrom.

MODE FOR CARRYING OUT THE INVENTION

Embodiments of the present technology will be described in the following order.

1 First Embodiment
 1.1 Outline
 1.2 Configuration of Magnetic Recording Medium
 1.3 Configuration of Sputtering Device
 1.4 Method for Manufacturing Magnetic Recording Medium
 1.5 Effect
 1.6 Modification
2 Second Embodiment
 2.1 Configuration of Magnetic Recording Medium
 2.2 Effect

[1.1 Outline]

As a method for changing stiffness of a magnetic recording medium, the present technology proposes a magnetic recording medium having a structure provided with a soft magnetic underlayer. A magnetic recording medium provided with a metal-containing layer other than the soft magnetic underlayer also enhances stiffness of the magnetic recording medium. However, a magnetic recording medium provided with a soft magnetic underlayer has a promising effect of enhancing servo signal output because such a magnetic recording medium prevents generation of surface magnetization in a perpendicular direction to a film when a servo signal is written. Accordingly, as a configuration for enhancing stiffness of a magnetic recording medium, a magnetic recording medium provided with a soft magnetic underlayer is more advantageous than a magnetic recording medium provided with a metal-containing layer other than the soft magnetic underlayer.

Furthermore, a soft magnetic underlayer is generally effective when used in combination with a single pole type (SPT) record head dedicated to perpendicular magnetic recording and may not be sufficiently effective when used in combination with what is called a ring type record head which is currently used in data storage systems. On the contrary, there is a possibility that the latter case causes noise attributed to the soft magnetic underlayer and decreases an SNR.

Accordingly, in light of the above problems, the present inventors have studied a magnetic recording medium having high tracking servo characteristics and a high signal-noise ratio (SNR) in combination with a ring type record head and a soft magnetic underlayer. As a result of the study, the present inventors have found a configuration in which a soft magnetic layer has an average thickness of 10 nm or more and 50 nm or less and in which a difference in Young's modulus between a magnetic recording medium and a substrate in a longitudinal direction of the substrate is 2.4 GPa or more.

[1.2 Configuration of Magnetic Recording Medium]

Figure 1:
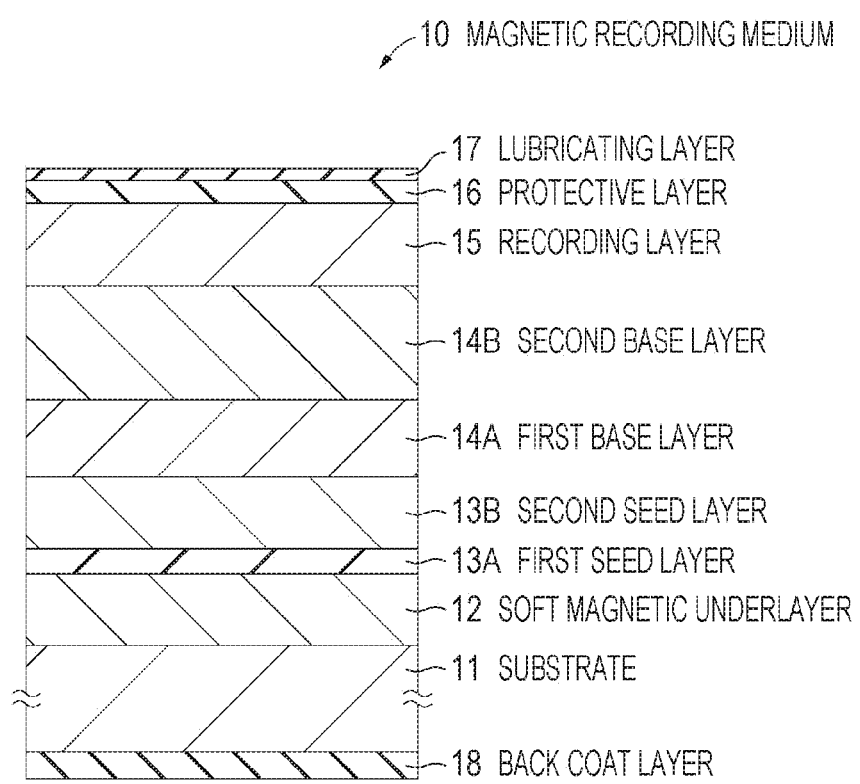
FIG. 1 is a cross-sectional view showing an exemplary configuration of a magnetic recording medium according to a first embodiment of the present technology.

A magnetic recording medium 10 according to a first embodiment of the present technology is an elongated perpendicular magnetic recording medium. As shown in FIG. 1, the magnetic recording medium 10 is provided with a film-like substrate 11, a soft magnetic underlayer (hereinafter referred to as an "SUL") 12, a first seed layer 13A, a second seed layer 13B, a first base layer 14A, a second base layer 14B, and a recording layer 15.

The SUL 12, the first and second seed layers 13A and 13B, and the first and second base layers 14A and 14B are disposed between one main surface (hereinafter referred to as a "surface") of the substrate 11 and the recording layer 15. The SUL 12, the first seed layer 13A, the second seed layer 13B, the first base layer 14A, and the second base layer 14B are laminated in this order from the substrate 11 toward the recording layer 15.

As needed, the magnetic recording medium 10 may further include a protective layer 16 disposed on the recording layer 15 and a lubricating layer 17 disposed on the protective layer 16. Furthermore, the magnetic recording medium 10 may also include a back coat layer 18 disposed on the other main surface (hereinafter referred to as a "rear surface") of the substrate 11 as needed.

Hereinafter, a longitudinal direction of the magnetic recording medium 10 (longitudinal direction of the substrate 11) is referred to as a "machine direction (MD)". Here, the machine direction indicates a moving direction of record and reproduce heads relative to the magnetic recording medium 10, that is, a direction in which the magnetic recording medium 10 runs during recording and reproducing.

The magnetic recording medium 10 according to the first embodiment is preferably used as a storage medium for data archive which is anticipated to grow in demand more and more in the future. The magnetic recording medium 10 enables, for example, an areal recording density at least ten times an areal recording density of a current particulate magnetic recording medium for storage, that is, an areal recording density of 50 Gb/in$^2$ or more. A typical linear recording data cartridge provided with the magnetic recording medium 10 having such an areal recording density enables large-capacity recording as much as 100 TB or more per one data cartridge.

The magnetic recording medium 10 according to the first embodiment is preferable for a recording/reproducing device (recording/reproducing device for recording and reproducing data) that includes a ring type record head and a giant magnetoresistive (GMR) or tunneling magnetoresistive (TMR) reproduce head. Furthermore, it is preferable that the magnetic recording medium 10 according to the first embodiment should be one that includes a ring type record head as a servo signal write head. A data signal is perpendicularly recorded on the recording layer 15 by, for example, a ring type record head. Furthermore, a servo signal is perpendicularly recorded on the recording layer 15 by, for example, a ring type record head.

A difference $\Delta E$ (=E1−E2) between a Young's modulus E1 of the magnetic recording medium 10 and a Young's modulus E2 of the substrate 11 in the MD is 2.4 GPa or more, and preferably 2.5 GPa or more. If the difference $\Delta E$ between the Young's moduli E1 and E2 is less than 2.4 GPa, there is a possibility that tracking servo characteristics deteriorates precipitously. Here, the tracking servo characteristics refers to control for aligning a position of a magnetic head (record head or reproduce head) relative to the magnetic recording medium 10 so as to enable the magnetic head to trace a track, and the tracking servo characteristics are assessed by, for example, a position error signal (PES). The upper limit of the difference $\Delta E$ between the Young's moduli E1 and E2 is preferably 4.0 GPa or less. If the difference $\Delta E$ between the Young's moduli E1 and E2 is 4.0 GPa or less, it is possible to achieve a good contact with the magnetic head and to assure a high SNR.

The difference $\Delta E$ between the Young's modulus E1 of the magnetic recording medium 10 and the Young's modulus E2 of the substrate 11 in the MD is determined in the following manner. First, the magnetic recording medium 10 is cut into a length of 100 mm to prepare a first measurement sample. Next, the Young's modulus E1 of the first measurement sample in the MD is measured with a tensile testing machine (TCM-200CR, a product of MNB) at a temperature of 23° C. and a relative humidity of 60%. At this time, the pulling speed is 100 mm/min.

Next, the magnetic recording medium 10 is cut into a length of 100 mm, and then, each layer is peeled off from both surfaces of the substrate 11 so that only the substrate 11 is taken out, whereby preparing a second measurement sample. Next, the Young's modulus E2 of the second measurement sample in the MD is measured in a similar manner to the first measurement sample. Thereafter, the difference $\Delta E$ (=E1−E2) between the Young's moduli E1 and E2 of the first and second measurement samples is determined.

(Substrate)

The substrate 11 serving as a support is a flexible elongated nonmagnetic substrate. The substrate 11 is what is called a film, having a thickness of, for example, 3 μm or more and 8 μm or less. An example of a material of the substrate 11 includes a flexible polymer resin material that is used for a typical magnetic recording medium. Specific examples of such a polymer resin material include polyesters, polyolefins, cellulose derivatives, vinyl resins, polyimides, polyamides, or polycarbonates.

(SUL)

The SUL 12 contains a soft magnetic material in an amorphous state. The soft magnetic material contains, for example, at least one of a Co-based material or an Fe-based material. The Co-based material contains, for example, CoZrNb, CoZrTa, or CoZrTaNb. The Fe-based material contains, for example, FeCoB, FeCoZr, or FeCoTa.

The SUL 12 is a single-layer SUL directly disposed on the substrate 11. The SUL 12 has an average thickness of 10 nm or more and 50 nm or less, and preferably 20 nm or more and 30 nm or less. The SUL 12 having an average thickness below 10 nm leads to a possibility that the difference ΔE between the Young's modulus E1 of the magnetic recording medium 10 and the Young's modulus E2 of the substrate 11 in the MD becomes less than 2.4 GPa. On the other hand, the SUL having an average thickness of over 50 nm leads to a possibility of reduction in SNR of the magnetic recording medium 10.

An average thickness of SUL 12 is determined in the following manner. First, the magnetic recording medium 10 is thinly processed in a perpendicular direction relative to the main surface to prepare a sample piece. A cross section of the test piece is observed by a transmission electron microscope (TEM).

The measurement conditions of TEM are shown below.
Device: TEM (Hitachi, H9000NAR)
Acceleration voltage: 300 kV
Magnification: 100000-fold Next, an average thickness of the SUL 12 is calculated from the observed TEM image. Specifically, an average thickness of the SUL 12 is calculated by creating a histogram with Image Measuring Tool, or SEM/TEM measurement software available from Foundation for Promotion of Material Science and Technology of Japan.

Herein, note that average thicknesses of layers other than the SUL 12 (in other words, average thicknesses of the first and second seed layers 13A and 13B, the first and second base layers 14A and 14B, and the recording layer 15) are determined in a similar manner to an average thickness of the SUL 12.

(First and Second Seed Layers)

The first seed layer 13A is in an amorphous state, containing an alloy that includes Ti and Cr. Furthermore, this alloy may also include O (oxygen). This oxygen may be impurity oxygen that is contained in minute quantities in the first seed layer 13A when the first seed layer 13A is deposited by a deposition technique such as sputtering.

Here, the term "alloy" represents at least one of a Ti and Cr-containing solid solution, eutectic, or intermetallic compound. The term "amorphous state" indicates that halo is observed by, for example, X-ray diffraction or electron beam diffraction and that no crystal structure is specified.

An atomic ratio of Ti to the total amount of Ti and Cr contained in the first seed layer 13A is preferably 30 atomic % or more and less than 100 atomic %, and more preferably 50 atomic % or more and less than 100 atomic %. An atomic ratio of Ti below 30% orients the (100) plane of a body-centered cubic (bcc) lattice structure of Cr. Accordingly, there is a possibility of decline in orientation of the first and second base layers 14A and 14B formed on the first seed layer 13A.

An atomic ratio of Ti is determined in the following manner. While ion-milling the magnetic recording medium 10 from the side close to the recording layer 15, a depth direction of the first seed layer 13A is analyzed (depth profile measurement) by auger electron spectroscopy (hereinafter referred to as "AES"). Next, on the basis of the determined depth profile, an average composition (average atomic ratio) of Ti and Cr in a film thickness direction is obtained. Next, an atomic ratio of Ti is determined by the obtained average composition of Ti and Cr.

In a case where the first seed layer 13A contains Ti, Cr, and O, an atomic ratio of O to the total amount of Ti, Cr, and O contained in the first seed layer 13A is preferably 15 atomic % or less, and more preferably 10 atomic % or less. An atomic ratio of O over 15 atomic % forms $TiO_2$ crystals and affects crystal nucleation of the first and second base layers 14A and 14B formed on the first seed layer 13A. Accordingly, there is a possibility of significant decline in orientation of the first and second base layers 14A and 14B. An atomic ratio of O is determined by an analysis method similarly to an atomic ratio of Ti.

The alloy contained in the first seed layer 13A may further contain an element other than Ti and Cr as an additional element. An example of this additional element includes one or more elements selected from the group including Nb, Ni, Mo, Al, and W.

The first seed layer 13A preferably has an average thickness of 2 nm or more and 15 nm or less, more preferably 3 nm or more and 10 m or less.

The second seed layer 13B is in a crystalline state, containing, for example, NiW or Ta. The second seed layer 13B preferably has an average thickness of 3 nm or more and 20 nm or less, more preferably 5 nm or more and 15 nm or less.

The first and second seed layers 13A and 13B have a crystal structure similar to that of the first and second base layers 14A and 14B. The first and second seed layers 13A and 13B are not seed layers for crystal growth but for enhancing perpendicular orientation of the first and second base layers 14A and 14B by being in an amorphous state.

(First and Second Base Layers)

The first and second base layers 14A and 14B preferably have a crystal structure similar to that of the recording layer 15. In a case where the recording layer 15 contains a Co alloy, the first and second base layers 14A and 14B contain a material having a hexagonal close-packed (hcp) structure similar to that of the Co alloy. It is preferable that the c-axis of the structure is oriented in a direction perpendicular to a film surface (that is, in a film thickness direction). This is because such a structure enhances orientation of the recording layer 15 and enables relatively good matching of lattice constant between the second base layer 14B and the recording layer 15. As a material having a hcp structure, a Ru-containing material is preferable, specifically, elemental Ru or Ru alloy is preferable. Examples of the Ru alloy include Ru alloy oxides such as Ru—$SiO_2$, Ru—$TiO_2$ or Ru—$ZrO_2$.

As described above, the first and second base layers 14A and 14B may employ similar materials. However, the first and second base layers 14A and 14B have different intended effects. Specifically, the second base layer 14B has a film structure that accelerates a granular structure of the recording layer 15 which is an upper layer of the second base layer 14B, while the first base layer 14A has a film structure with high crystal orientation. In order to obtain such film structures, it is preferable that the first and second base layers 14A and 14B should be deposited under different deposition conditions or different sputtering conditions.

The first base layer 14A preferably has an average thickness of 3 nm or more and 15 nm or less, and more preferably 5 nm or more and 10 nm or less. The second base layer 14B preferably has an average thickness of 7 nm or more and 40 nm or less, and more preferably 10 nm or more and 25 nm or less.

(Recording Layer)

The recording layer 15 as a magnetic layer is what is called a perpendicular magnetic recording layer. The recording layer 15 is preferably a granular magnetic layer containing a Co alloy from the viewpoint of enhancing recording density. This granular magnetic layer includes Co alloy-containing ferromagnetic crystal particles and a nonmagnetic grain boundary (nonmagnetic material) surrounding the ferromagnetic crystal particles. More specifically, the granular magnetic layer includes Co alloy-containing columns (columnar crystals) and a nonmagnetic grain boundary (for example, an oxide such as $SiO_2$) that surrounds the columns and magnetically separates the columns. In the recording layer 15 with such a structure, the columns are magnetically separated from each other.

A Co alloy has a hcp structure, and the c-axis of the structure is oriented in a direction perpendicular to a film surface (film thickness direction). As the Co alloy, it is preferable to use a CoCrPt alloy containing at least Co, Cr, or Pt. The CoCrPt alloy is not particularly limited, and the CoCrPt alloy may further contain an additional element. An example of the additional element includes one or more elements selected from the group including Ni and Ta.

The nonmagnetic grain boundary surrounding the ferromagnetic crystal particles includes a nonmagnetic metal material. Here, metal includes semimetal. As the nonmagnetic metal material, for example, at least one of metal oxides or metal nitrides is used. From the viewpoint of maintaining the granular structure more stably, it is preferable to use a metal oxide. Examples of the metal oxides include those containing at least one element selected from the group including Si, Cr, Co, Al, Ti, Ta, Zr, Ce, Y, and Hf, and a preferable example is a metal oxide that contains at least a Si oxide (that is, $SiO_2$). Specific examples of the metal oxides include $SiO_2$, $Cr_2O_3$, CoO, $Al_2O_3$, $TiO_2$, $Ta_2O_5$, $ZrO_2$, or $HfO_2$. Examples of the metal nitrides include those containing at least one element selected from the group including Si, Cr, Co, Al, Ti, Ta, Zr, Ce, Y, and Hf. Specific examples of the metal nitride include SiN, TiN, and AlN.

It is preferable that the CoCrPt alloy contained in the ferromagnetic crystal particles and the Si oxide contained in the nonmagnetic grain boundary should have an average composition shown in the following Formula (1). This is because such a structure enables saturation magnetization (Ms) that prevents influences from a diamagnetic field and assures sufficient reproducing output, leading to further enhancement of recording and reproducing characteristics.

$$(Co_xPt_yCr_{100-x-y})_{100-z}\text{---}(SiO_2)_z \quad (1)$$

(In Formula (1), x, y, and z are values within a range of $69 \leq X \leq 75$, $10 \leq y \leq 16$, and $9 \leq Z \leq 12$, respectively.

Note that the above composition is determined in the following manner. While ion milling of the magnetic recording medium 10 is performed from the side close to the recording layer 15, a depth direction of the recording layer 15 is analyzed by AES, whereby determining an average composition (average atomic ratio) of Co, Pt, Cr, Si, and O in the film thickness direction.

The recording layer 15 preferably has an average thickness of 7 nm or more and 20 nm or less, and more preferably 9 nm or more and 15 nm or less.

(Protective Layer)

The protective layer 16 contains, for example, a carbon material or silicon dioxide ($SiO_2$). From the aspect of film strength of the protective layer 16, it is preferable that the protective layer 16 should contain a carbon material. Examples of the carbon material include graphite, diamond-like carbon (DLC), and diamond.

(Lubricating Layer)

The lubricating layer 17 contains at least one lubricant. As needed, the lubricating layer 17 may further contain various types of additives, for example, a rust inhibitor. The lubricant has at least two carboxyl groups and one ester bond, containing at least one kind of carboxylic acid compounds represented by the following General Formula (1). The lubricant may further contain a lubricant of different type from the carboxylic acid compounds represented by the following General Formula (1).

General Formula (1):

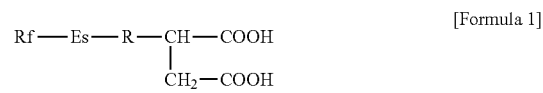

[Formula 1]

(where Rf is an unsubstituted or substituted and saturated or unsaturated fluorine-containing hydrocarbon group or hydrocarbon group, Es is an ester bond, and R is, although R may be absent, an unsubstituted or substituted and saturated or unsaturated hydrocarbon group.

The carboxylic acid compounds are preferably represented by the following General Formula (2) or (3).

General Formula (2):

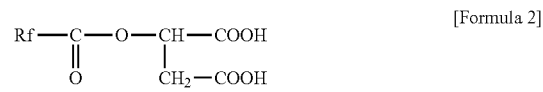

[Formula 2]

(where Rf is an unsubstituted or substituted and saturated or unsaturated fluorine-containing hydrocarbon group or hydrocarbon group.)

General Formula (3):

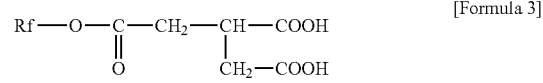

[Formula 3]

(where Rf is an unsubstituted or substituted and saturated or unsaturated fluorine-containing hydrocarbon group or hydrocarbon group.)

The lubricant preferably contains one or both of the carboxylic acid compounds represented by General Formulae (2) and (3).

If a lubricant containing a carboxylic acid compound represented by the General Formula (1) is applied to the recording layer 15 or the protective layer 16, a lubricating action is caused by cohesion between fluorine-containing hydrocarbon groups or hydrocarbon groups Rf, or hydrophobic groups. In a case where the Rf groups are fluorine-containing hydrocarbon groups, the total number of carbon atoms is 6 to 50, and it is preferable that the total number of carbon atoms in the fluorinated hydrocarbon groups is 4 to 20. The Rf groups may be saturated or unsaturated, or linear or branched chains, but are preferably saturated and linear chains.

For example, in a case where the Rf groups are hydrocarbon groups, the Rf groups are preferably represented by the following General Formula (4).

General Formula (4):

  [Formula 4]

(In General Formula (4), l is an integer selected from 8 to 30, and more preferably 12 to 20.)

Furthermore, in a case where the Rf groups are fluorine-containing hydrocarbon groups, the Rf groups are preferably represented by the following General Formula (5).

General Formula (5):

  [Formula 5]

(In General Formula (5), m and n are an integer selected from m=2 to 20 and n=3 to 18, and more desirably m=4 to 13 and n=3 to 10).

The fluorinated hydrocarbon groups may be concentrated in one place as described above or may be dispersed as shown in the following General Formula (6) and may include not only $-CF_3$ and $-CF_2-$ but also $-CHF_2$, $-CHF-$, and the like.

General Formula (6):

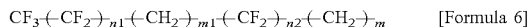  [Formula 6]

(In General Formula (6), n1+n2=n, m1+m2=m.)

The reason for limiting the number of carbon atoms in the General Formulae (4), (5), and (6) as described above is that if the number of carbon atoms included in an alkyl group or a fluorine-containing alkyl group (l or the sum of m and n) is equal to or more than the lower limit, the alkyl group or the fluorine-containing alkyl group has an appropriate length and cohesion between the hydrophobic groups becomes effective, which causes a satisfactory lubricating action and improves resistance to friction/abrasion. Furthermore, if the number of carbon atoms is equal to or less than the upper limit, solubility of the lubricant including a carboxylic acid compound in a solvent is kept satisfactory.

Particularly, an Rf group containing a fluorine atom is effective in, for example, reducing friction coefficients and improving running quality. However, it is preferable to provide a hydrocarbon group between a fluorine-containing hydrocarbon group and an ester bond to space the fluorine-containing hydrocarbon group and the ester bond so as to assure the stability of the ester bond and to prevent hydrolysis.

Furthermore, the Rf groups may have a fluoroalkyl ether group or a perfluoropolyether group.

R groups may be absent, but in the presence of R groups, it is preferable that the R groups should be hydrocarbon chains having a relatively small number of carbon atoms.

Furthermore, the Rf groups or the R groups contain an element such as nitrogen, oxygen, sulfur, phosphorus, and halogen as a constituent element. In addition to those functional groups, the Rf groups or the R groups may contain, for example, a hydroxyl group, a carboxyl group, a carbonyl group, an amino group, and an ester bond.

Specifically, it is preferable that the carboxylic acid compounds represented by General Formula (1) should be at least one of the following compounds. In other words, the lubricant preferably contains at least one of the following compounds.

$CF_3(CF_2)_7(CH_2)_{10}COOCH(COOH)CH_2COOH$
$CF_3(CF_2)_3(CH_2)_{10}COOCH(COOH)CH_2COOH$
$C_{17}H_{35}COOCH(COOH)CH_2COOH$
$CF_3(CF_2)_7(CH_2)_2OCOCH_2CH(C_{18}H_{37})COOCH(COOH)CH_2COOH$
$CF_3(CF_2)_7COOCH(COOH)CH_2COOH$
$CHF_2(CF_2)_7COOCH(COOH)CH_2COOH$
$CF_3(CF_2)_7(CH_2)_2OCOCH_2CH(COOH)CH_2COOH$
$CF_3(CF_2)_7(CH_2)_6OCOCH_2CH(COOH)CH_2COOH$
$CF_3(CF_2)_7(CH_2)_{11}OCOCH_2CH(COOH)CH_2COOH$
$CF_3(CF_2)_3(CH_2)_6OCOCH_2CH(COOH)CH_2COOH$
$C_{18}H_{37}OCOCH_2CH(COOH)CH_2COOH$
$CF_3(CF_2)_7(CH_2)_4COOCH(COOH)CH_2COOH$
$CF_3(CF_2)_3(CH_2)_4COOCH(COOH)CH_2COOH$
$CF_3(CF_2)_3(CH_2)_7COOCH(COOH)CH_2COOH$
$CF_3(CF_2)_9(CH_2)_{10}COOCH(COOH)CH_2COOH$
$CF_3(CF_2)_7(CH_2)_{12}COOCH(COOH)CH_2COOH$
$CF_3(CF_2)_5(CH_2)_{10}COOCH(COOH)CH_2COOH$
$CF_3(CF_2)_7CH(C_9H_{19})CH_2CH=CH(CH_2)_7COOCH(COOH)CH_2COOH$
$CF_3(CF_2)_7CH(C_6H_{13})(CH_2)_7COOCH(COOH)CH_2COOH$
$CH_3(CH_2)_3(CH_2CH_2CH(CH_2CH_2(CF_2)_9CF_3))_2(CH_2)_7COOCH(COOH)CH_2COOH$

The carboxylic acid compounds represented by the General Formula (1) are soluble in a non-fluorine solvent having a low environmental burden and have an advantage of enabling operations such as coating, immersion, and spraying with a general-purpose solvent such as a hydrocarbon solvent, a ketone solvent, an alcohol solvent, and an ester solvent. Specifically, examples of the carboxylic acid compounds represented by the General Formula (1) include solvents such as hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, and cyclohexanone.

In a case where the protective layer 16 includes a carbon material, when one of the aforementioned carboxylic acid compounds as a lubricant is applied to the protective layer 16, the protective layer 16 absorbs two carboxylic groups which are polar groups of a lubricant molecule and at least one ester bond, which makes the lubricating layer 17 particularly durable due to cohesion between hydrophobic groups.

Note that the lubricant may not only be held as the lubricating layer 17 on the surface of the magnetic recording medium 10 as described above but also be contained in layers such as the recording layer 15 and the protective layer 16 included in the magnetic recording medium 10.

(Back Coat Layer)

The back coat layer 18 contains, for example, a binder, inorganic particles, and a lubricant. As needed, the back coat layer 18 may contain various kinds of additives such as a curing agent and an antistatic agent.

[1.3 Configuration of Sputtering Device]

Figure 2:
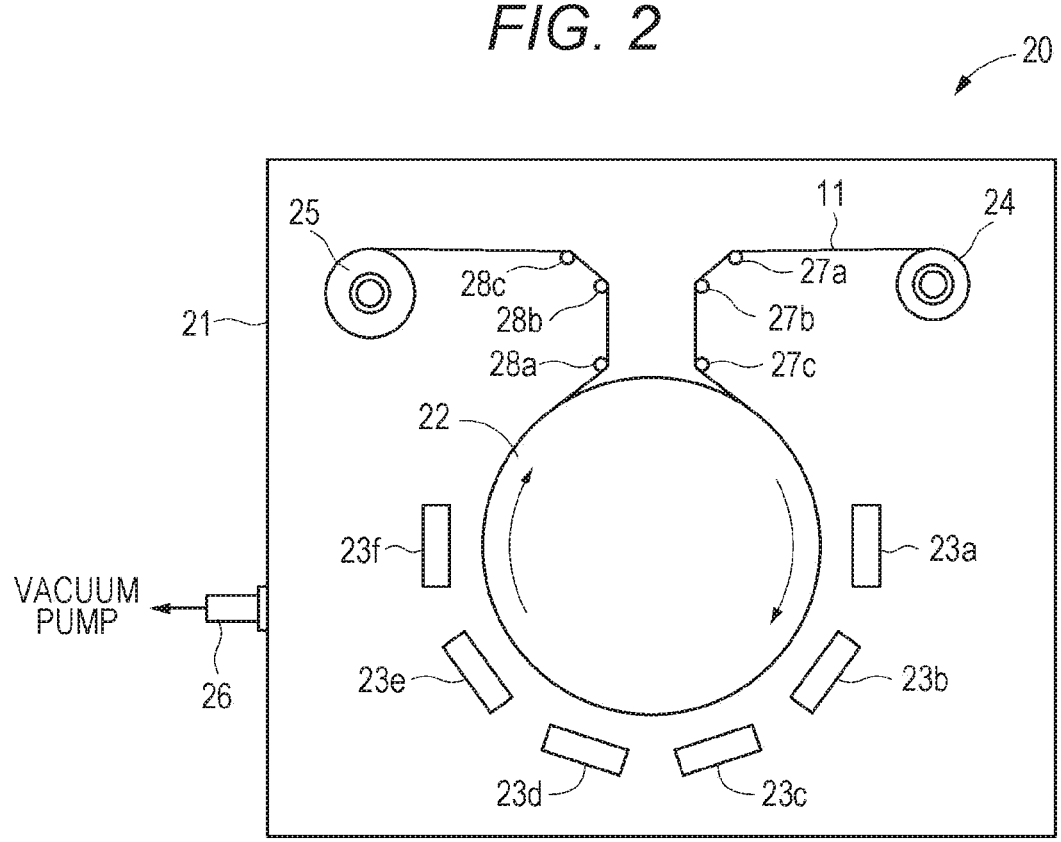
FIG. 2 is a schematic view showing an exemplary configuration of a sputtering device used for manufacturing the magnetic recording medium according to the first embodiment of the present technology.

With reference to FIG. 2, hereinafter described is an exemplary configuration of a sputtering device 20 used for manufacturing the magnetic recording medium 10 according to the first embodiment of the present technology. The sputtering device 20 is a roll-to-roll sputtering device used for deposition of the SUL 12, the first seed layer 13A, the second seed layer 13B, the first base layer 14A, the second base layer 14B, and the recording layer 15. As shown in FIG. 2, the sputtering device 20 is provided with a deposition chamber 21, a drum 22 or a metal can (rotary body), cathodes 23a to 23f, a delivery reel 24, a take-up reel 25, and a plurality of guide rollers 27a to 27c and 28a to 28c. The sputtering device 20 is of, for example, a direct current (DC) magnetron sputtering type, but the type of sputtering is not limited to DC.

The deposition chamber 21 is connected to a vacuum pump (not shown) via an exhaust port 26. This vacuum pump enables setting of the atmosphere inside the deposition chamber 21 to a predetermined vacuum. The rotatable drum 22, the delivery reel 24, and the take-up reel 25 are disposed inside the deposition chamber 21. The inside of the deposition chamber 21 is provided with the plurality of guide rollers 27a to 27c that guides the substrate 11 so that the substrate 11 is conveyed between the delivery reel 24 and the drum 22, and is also provided with the plurality of guide rollers 28a to 28c that guides the substrate 11 so that the substrate 11 is conveyed between the drum 22 and the take-up reel 25. During sputtering, the substrate 11 unwound from the delivery reel 24 is wound around the take-up reel 25 through the guide rollers 27a to 27c, the drum 22, and the guide rollers 28a to 28c. The drum 22 has a cylindrical shape, and the elongated substrate 11 is conveyed along the cylindrical peripheral surface of the drum 22. The drum 22 is provided with a cooling mechanism (not shown) and is cooled to, for example, about −20° C. during sputtering. The plurality of cathodes 23a to 23f is disposed inside the deposition chamber 21, facing the peripheral surface of the drum 22. A target is set to each of these cathodes 23a to 23f. Specifically, targets for depositing the SUL 12, the first seed layer 13A, the second seed layer 13B, the first base layer 14A, the second base layer 14B, and the recording layer 15 are set to the cathodes 23a, 23b, 23c, 23d, 23e, and 23f, respectively. These cathodes 23a to 23f enable simultaneous deposition of a plurality of types of films, that is, the SUL 12, the first seed layer 13A, the second seed layer 13B, the first base layer 14A, the second base layer 14B, and the recording layer 15.

With the sputtering device 20 having such a configuration, the SUL 12, the first seed layer 13A, the second seed layer 13B, the first base layer 14A, the second base layer 14B, and the recording layer 15 are continuously deposited by the roll-to-roll method.

[1.4 Method for Manufacturing Magnetic Recording Medium]

The magnetic recording medium 10 according to the first embodiment of the present technology is manufactured, for example, in the following manner.

First, using the sputtering device 20 shown in FIG. 2, the SUL 12, the first seed layer 13A, the second seed layer 13B, the first base layer 14A, the second base layer 14B, and the recording layer 15 are sequentially deposited on the surface of the substrate 11. Specifically, the deposition is carried out in the following manner. First, the deposition chamber 21 is evacuated to a predetermined pressure. Thereafter, the targets set on the cathodes 23a to 23f are sputtered while a process gas such as Ar gas is introduced into the deposition chamber 21. Accordingly, the SUL 12, the first seed layer 13A, the second seed layer 13B, the first base layer 14A, the second base layer 14B, and the recording layer 15 are sequentially deposited on the surface of the running substrate 11.

The atmosphere of the deposition chamber 21 during sputtering is set to, for example, about $1 \times 10^{-5}$ Pa to $5 \times 10^{-5}$ Pa. Film thicknesses and characteristics of the SUL 12, the first seed layer 13A, the second seed layer 13B, the first base layer 14A, the second base layer 14B, and the recording layer 15 are controlled by adjusting a tape line speed at which the substrate 11 is wound, a pressure of a process gas such as Ar gas to be introduced during sputtering (sputtering gas pressure), and input power.

Next, the protective layer 16 is deposited on the recording layer 15. As a method for depositing the protective layer 16, for example, chemical vapor deposition (CVD) or physical vapor deposition (PVD) is employable.

Next, a binder, inorganic particles, a lubricant, and the like are kneaded into a solvent and dispersed therein so as to prepare a coating material for deposition of a back coat layer. Next, the coating material for deposition of a back coat layer is applied on the rear surface of the substrate 11 and dried to deposit the back coat layer 18 on the rear surface of the substrate 11.

Next, for example, a lubricant is applied on the protective layer 16 to deposit the lubricating layer 17. Examples of a method for coating the lubricant include various coating techniques such as gravure coating and dip coating. Next, as needed, the magnetic recording medium 10 is cut into a predetermined width. Following these processes yields the magnetic recording medium 10 shown in FIG. 1.

[1.5 Effect]

In the magnetic recording medium 10 according to the first embodiment, an average thickness of the SUL 12 is 10 nm or more to 50 nm or less, and the difference $\Delta E$ (=E1−E2) between the Young's modulus E1 of the magnetic recording medium 10 and the Young's modulus E2 of the substrate 11 in the MD is 2.4 GPa or more. Such a structure yields the magnetic recording medium 10 having high tracking servo characteristics and a high SNR.

[1.6 Modification]

The magnetic recording medium 10 may further include a base layer between the substrate 11 and the SUL 12. Since the SUL 12 is in an amorphous state, the SUL 12 is not required to play a role of accelerating epitaxial growth of the layers formed on the SUL 12 but is required not to disarrange crystal orientation of the first and second base layers 14A and 14B formed on the SUL 12. To meet such requirements, it is preferable that the soft magnetic material should have a fine structure that does not form a column. However, with a large influence of degassing such as moisture from the substrate 11, there is a possibility that the soft magnetic material becomes coarse and causes disarrangement of crystal orientation of the first and second base layers 14A and 14B formed on the SUL 12. In order to prevent the influence of degassing such as moisture from the substrate 11, it is preferable that a base layer in an amorphous state including a Ti and Cr-containing alloy should be provided between the substrate 11 and the SUL 12 as described above. Specifically, the base layer may employ a configuration similar to that of the first seed layer 13A of the first embodiment.

The magnetic recording medium 10 may not include at least one of the second seed layer 13B or the second base layer 14B. However, from the viewpoint of improving the SNR, it is more preferable to include both the second seed layer 13B and the second base layer 14B.

The magnetic recording medium 10 may be provided with an antiparallel coupled SUL (APC-SUL) instead of the single layer SUL.

2 Second Embodiment

[2.1 Configuration of Magnetic Recording Medium]

Figure 3:
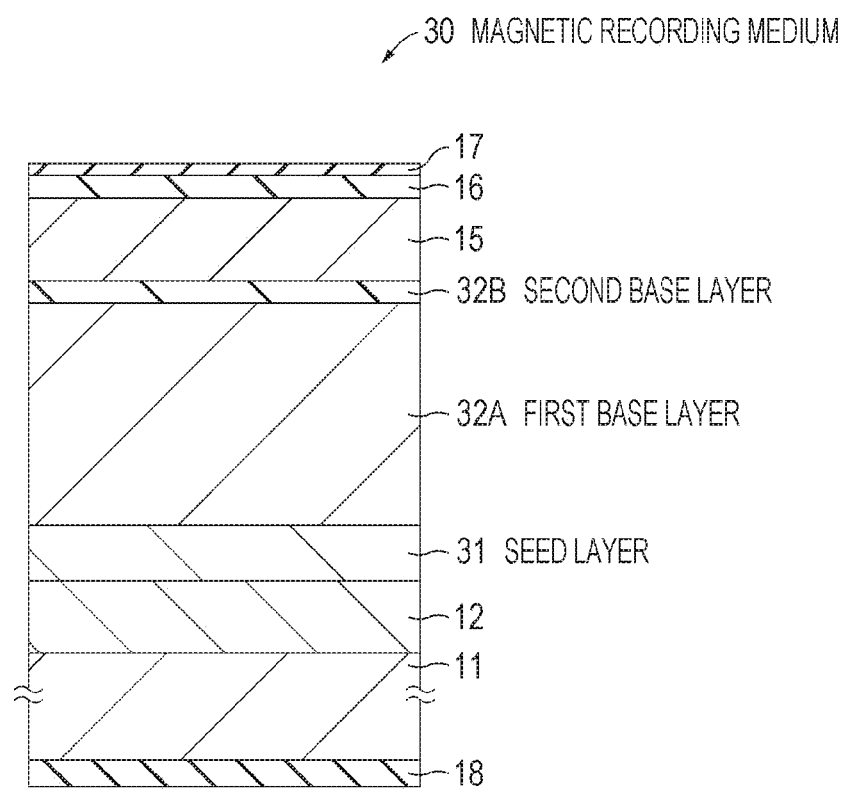
FIG. 3 is a cross-sectional view showing an exemplary configuration of a magnetic recording medium according to a second embodiment of the present technology.

A magnetic recording medium 30 according to a second embodiment, as shown in FIG. 3, includes a substrate 11, an SUL 12, a seed layer 31, a first base layer 32A, a second base layer 32B, and a recording layer 15. In the second embodiment, note that those similar to the parts in the first embodiment are denoted by the same reference numerals, and description thereof will be omitted.

The SUL 12, the seed layer 31, and the first and second base layers 32A and 32B are disposed between one main surface of the substrate 11 of the substrate 11 and the recording layer 15. The SUL 12, the seed layer 31, the first base layer 32A, and the second base layer 32B are laminated in this order from the substrate 11 to the recording layer 15.

(Seed Layer)

The seed layer 31 contains Cr, Ni, and Fe and has a face-centered cubic lattice (fcc) structure. The (111) plane of this fcc structure is preferentially oriented to be parallel to the surface of the substrate 11. Here, the term "preferentially oriented" indicates a state in which a diffraction peak strength from the (111) plane of an fcc structure in a θ-2θ scan of the X-ray diffraction is larger than a diffraction peak from other crystal planes, or a state in which only a diffraction peak strength from the (111) plane of an fcc structure is observed in a θ-2θ scan of the X-ray diffraction.

From the viewpoint of improving an SNR, a strength ratio of the seed layer 31 in the X-ray diffraction is preferably 60 cps/nm or more, more preferably 70 cps/nm or more, and still more preferably 80 cps/nm or more. Here, the strength ratio of the seed layer 31 in the X-ray diffraction is a value (I/D (cps/nm)) determined by dividing a strength I (cps) of the X-ray diffraction of the seed layer 31 by an average thickness D (nm) of the seed layer 31.

It is preferable that Cr, Ni, and Fe contained in the seed layer 31 should have an average composition represented by the following Formula (2).

$$Cr_X(Ni_YFe_{130-Y})_{100-X} \quad (2)$$

(In Formula (2), 10≤X≤45 and 60≤Y≤90.)

X within the above range enhances (111) orientation of the fcc structure of Cr, Ni, and Fe and yields a better SNR. Similarly, Y within the above range enhances (111) orientation of the fcc structure of Cr, Ni, and Fe and yields a better SNR.

The seed layer 31 preferably has an average thickness of 5 nm or more and 40 nm or less. Setting an average thickness of the seed layer 31 within the above range enhances (111) orientation of the fcc structure of Cr, Ni, and Fe and yields a better SNR. Note that an average thickness of the seed layer 31 is determined similarly to an average thickness of the SUL 12 of the first embodiment.

(First and Second Base Layers)

The first base layer 32A contains Co and O having an fcc structure, and has a column (columnar crystal) structure. The first base layer 32A containing Co and O produces effects (functions) substantially similar to those of the second base layer 32B containing Ru. A concentration ratio of an average atomic concentration of O to an average atomic concentration of Co ((average atomic concentration of O)/(average atomic concentration of Co)) is 1 or more. A concentration ratio of 1 or more improves an effect of disposing the first base layer 32A and yields a better SNR.

The column structure is preferably inclined from the viewpoint of improving an SNR. A direction of the inclination is preferably a longitudinal direction of the elongated magnetic recording medium 30. The reason why the longitudinal direction is preferable is as follows. The magnetic recording medium 30 according to this embodiment is what is called a magnetic recording medium for linear recording, and a recording track thereof is parallel to the longitudinal direction of the magnetic recording medium 30. Furthermore, the magnetic recording medium 30 according to this embodiment is what is called a perpendicular magnetic recording medium, and from the aspect of recording characteristics, it is preferable that the crystal orientation axis of the recording layer 15 should be perpendicular. However, the crystal orientation axis of the recording layer 15 may be inclined, being affected by the inclination of the column structure of the first base layer 32A. In the magnetic recording medium 30 for linear recording, with relation to the magnetic field of a head at the time of recording, a configuration in which the crystal orientation axis of the recording layer 15 is inclined in the longitudinal direction of the magnetic recording medium 30 reduces an influence on the recording characteristics due to the inclination of the crystal orientation axis, compared with a configuration in which the crystal orientation axis of the recording layer 15 is inclined in a width direction of the magnetic recording medium 30. In order to make the crystal orientation axis of the recording layer 15 inclined in the longitudinal direction of the magnetic recording medium 30, it is preferable to incline the column structure of the first base layer 32A in the longitudinal direction of the magnetic recording medium 30 as described above.

An inclination angle of the column structure is preferably larger than 0 degree and less than 60 degrees. With an inclination angle over 0 degree and equal to or less than 60 degrees, the tip shape of the column included in the first base layer 32A changes largely and becomes substantially triangular, which enhances an effect of a granular structure and reduces noise. Accordingly, an SNR tends to increase. On the other hand, with an inclination angle over 60 degrees, the tip shape of the column included in the first base layer 32A changes slightly and is unlikely to become substantially triangular. Accordingly, the low noise effect tends to be diminished.

The column structure has an average particle diameter of 3 nm or more and 13 nm or less. An average particle diameter below 3 nm reduces an average particle diameter of the column structure included in the recording layer 15. Accordingly, there is a possibility that a current magnetic material deteriorates in ability to retain recording. On the other hand, an average particle diameter equal to or less than 13 nm prevents noise and yields a better SNR.

The first base layer 32A preferably has an average thickness of 10 nm or more and 150 nm or less. The first base layer 32A having an average thickness of 10 nm or more enhances (111) orientation of the fcc structure of the first base layer 32A and enables a better SNR. On the other hand, an average thickness of the first base layer 32A equal to or less than 150 nm prevents an increase in particle diameter of the column. Therefore, it is possible to prevent noise and yield a better SNR. Note that an average thickness of the first base layer 32A is determined similarly to an average thickness of the SUL 12 of the first embodiment.

The second base layer 32B preferably has a crystal structure similar to that of the recording layer 15. In a case where the recording layer 15 contains a Co alloy, the second base layer 32B contains a material having a hcp structure similar to that of the Co alloy. It is preferable that the c-axis in the structure should be oriented in a direction perpendicular to a film surface (that is, in a film thickness direction). This is because such a structure enhances orientation of the recording layer 15 and enables relatively good matching of lattice constant between the second base layer 32B and the recording layer 15. As a material having a hcp structure, a Ru-containing material is preferable, specifically, elemental Ru or Ru alloy is preferable. Examples of the Ru alloy include Ru alloy oxides such as Ru—SiO$_2$, Ru—TiO$_2$ or Ru—ZrO$_2$.

An average thickness of the second base layer 32B may be thinner than a base layer (for example, a Ru-containing base layer) in a typical magnetic recording medium and may be, for example, 1 nm or more and 5 nm or less. Since the seed layer 31 and the first base layer 32A having the aforementioned configuration are provided under the second base layer 32B, it is possible to obtain a good SNR even though an average thickness of the second base layer 32B is as thin as the above range. Note that an average thickness of the second base layer 32B is determined similarly to an average thickness of the SUL 12 of the first embodiment.

[2.2 Effect]

Similarly to the magnetic recording medium 10 according to the first embodiment, the magnetic recording medium 30 according to the second embodiment enables high tracking servo characteristics and a high SNR.

The magnetic recording medium 30 according to the second embodiment includes the seed layer 31 and the first base layer 32A between the substrate 11 and the second base layer 32B. The seed layer 31 contains Cr, Ni, and Fe and has an fcc structure. The (111) plane of this fcc structure is preferentially oriented to be parallel to the surface of the substrate 11. The first base layer 32A contains Co and O and has a column structure in which a ratio of an average atomic concentration of O to an average atomic concentration of Co is 1 or more and in which an average particle diameter is 3 nm or more and 13 nm or less. Such a structure reduces the thickness of the second base layer 32B, minimizing the use of Ru which is an expensive material. Such a structure also enables manufacturing of the recording layer 15 with good crystal orientation and a high coercive force.

Ru contained in the second base layer 32B has an hcp structure as Co which is the main component of the recording layer 15. For this reason, Ru has a dual effect of improving crystalline orientation and accelerating granular property of the recording layer 15. Furthermore, in order to further improve the crystal orientation of Ru included in the second base layer 32B, the first base layer 32A and the seed layer 31 are provided under the second base layer 32B. With the first base layer 32A containing inexpensive CoO having an fcc structure, the magnetic recording medium 30 according to the second embodiment produces effects (functions) substantially similar to those of the second base layer 32B containing Ru. Therefore, it is possible to reduce the thickness of the second base layer 32B. Furthermore, in order to enhance the crystal orientation of the first base layer 32A, the magnetic recording medium 30 according to the second embodiment is provided with the seed layer 31 containing Cr, Ni, and Fe.

EXAMPLE

Hereinafter, the present technology will be specifically described with reference to Examples, but the present technology is not limited by these Examples.

In Examples, average thicknesses of a SUL, first and second seed layers, first and second base layers, a recording layer, and a protective layer laminated on a polymer film serving as a substrate are determined similarly to an average thickness of the SUL in the first embodiment.

Furthermore, in Examples, the SUL, the first and second seed layers, the first and second base layers, and the recording layer may be collectively referred to as "metal-containing layers".

Examples 1 to 3, Comparative Examples 2, 3 and 4

(Deposition of SUL)

First, under the following deposition conditions, a CoZrNb layer (SUL) was deposited on a surface of an elongated polymer film. At this time, as shown in Table 1, the CoZrNb layer of each sample was made to have a different average thickness from 3 nm to 60 nm. Note that an aramid film with a thickness of 4.4 μm was used as the polymer film.

Deposition: DC magnetron sputtering
Target: CoZrNb target
Gas type: Ar
Gas pressure: 0.1 Pa (Deposition of First Seed Layer)

Next, under the following deposition conditions, a TiCr layer (first seed layer) having an average thickness of 5 nm was deposited on the CoZrNb layer.

Sputtering: DC magnetron sputtering
Target: TiCr target
Ultimate vacuum: $5\times10^{-5}$ Pa
Gas type: Ar
Gas pressure: 0.5 Pa (Deposition of Second Seed Layer)

Next, under the following deposition conditions, a NiW layer (second seed layer) having an average thickness of 10 nm was deposited on the TiCr layer.

Sputtering: DC magnetron sputtering
Target: NiW target
Ultimate vacuum: $5\times10^{-5}$ Pa
Gas type: Ar
Gas pressure: 0.5 Pa (Deposition of First Base Layer)

Next, under the following deposition conditions, a Ru layer (first base layer) having an average thickness of 10 nm was deposited on the NiW layer.

Sputtering: DC magnetron sputtering
Target: Ru target
Gas type: Ar
Gas pressure: 0.5 Pa (Deposition of Second Base Layer)

Next, under the following deposition conditions, a Ru layer (second base layer) having an average thickness of 20 nm was deposited on the Ru layer.

Sputtering: DC magnetron sputtering
Target: Ru target
Gas type: Ar
Gas pressure: 1.5 Pa (Deposition of Recording Layer)

Next, under the following deposition conditions, a (CoCrPt)—(SiO$_2$) layer (recording layer) having an average thickness of 14 nm was deposited on the Ru layer.

Deposition: DC magnetron sputtering
Target: (CoCrPt)—(SiO$_2$) target
Gas type: Ar
Gas pressure: 1.5 Pa (Deposition of Protective Layer)

Next, under the following deposition conditions, a carbon layer (protective layer) having an average thickness of 5 nm was deposited on the recording layer.

Deposition: DC magnetron sputtering
Target: Carbon target
Gas type: Ar
Gas pressure: 1.0 Pa (Deposition of Lubricating Layer)

Next, a lubricant was applied to the protective layer to deposit a lubricating layer.

(Deposition of Back Coat Layer)

Next, a coating material for deposition of a back coat layer was applied on a rear surface of the polymer film and dried, whereby forming a back coat layer. Following these processes yielded a magnetic tape of interest.

Comparative Example 1

A magnetic tape was obtained in a similar manner to Example 1 except that a CoZrNb layer was not formed.

Examples 4 to 6, Comparative Examples 5 and 6

A magnetic tape was yielded in a similar manner to Example 1 except that average thicknesses of a CoZrNb layer, TiCr layer, NiW layer, and Ru layers (first and second base layers) were changed for each sample as shown in Table 1, so that the sum of average thicknesses of metal-containing layers (that is, the sum of average thicknesses of the CoZrNb layer, TiCr layer, NiW layer, Ru layers (first and second base layers), and a (CoCrPt)—(SiO$_2$) layer) became 69 nm.

Comparative Example 7

A magnetic tape was yielded in a similar manner to Comparative Example 1 except that average thicknesses of a NiW layer and Ru layers (first and second base layers) were changed as shown in Table 1, so that the sum of average thicknesses of metal-containing layers (that is, the sum of average thicknesses of a TiCr layer, the NiW layer, the Ru layers (first and second base layers), and a (CoCrPt)—(SiO$_2$) layer) became 69 nm.

Examples 7 to 10

A magnetic tape was yielded in a similar manner to Example 1 except that a thickness of an aramid film (polymer film) was changed to a range from 4.1 μm to 5.2 μm as shown in Table 1.

Example 11, Comparative Example 8

A magnetic tape was yielded in a similar manner to Example 1 and Comparative Example 3 except that a CrNiFe layer and a CoO layer were deposited instead of a TiCr layer and a NiW layer and that a Ru layer as a second base layer was not deposited. Specifically, the CrNiFe layer and the CoO layer were deposited in the following manner.

(Deposition of First Seed Layer)
After forming a CoZrNb layer, a CrNiFe layer (first seed layer) having an average thickness of 15 nm was deposited on the CoZrNb layer under the following deposition conditions.
Sputtering: DC magnetron sputtering
Target: CoZrNb target
Gas type: Ar
Gas pressure: 0.25 Pa
(Deposition of Second Seed Layer)
After forming the CrNiFe seed layer, a CoO layer (second seed layer) having an average thickness of 15 nm was deposited on the CrNiFe seed layer under the following deposition conditions.
Sputtering: DC magnetron sputtering
Target: CoO target
Gas type: Ar
Gas pressure: 1 Pa

Example 12, Comparative Example 9

A magnetic tape was yielded in a similar manner to Example 1 and Comparative Example 3 except that a polyethylene terephthalate (PET) film having a thickness of 5.3 μm was used as a polymer film.

(Difference in Young's Modulus between Magnetic Tape and Polymer Film)

A difference in Young's modulus between the magnetic tape obtained as described above and the polymer film (substrate) in the longitudinal direction of the magnetic tape is determined by the method for calculating a difference in Young's modulus between the magnetic recording medium and the substrate according to the first embodiment.

(Characteristics Assessment)

With respect to the magnetic tape obtained as described above, servo signals were written close to an edge of the magnetic tape by a servo writer provided with a ring type record head. Then, recording and reproducing characteristics and a PES were assessed. As a servo writer, note that a commercially available servo writer was modified and used.

<Recording and Reproducing Characteristics>

A reproducing signal of each magnetic tape was acquired with a loop tester (a product of MicroPhysics, Inc.). Conditions for acquiring the reproducing signal are shown below.
Writer: Ring Type head
Reader: GMR head
Speed: 2 m/s
Signal: Single recording frequency (300 kfci)
Recording current: Optimum recording current Setting a recording wavelength at 300 kFCI (kilo Flux Changes per Inch), an SNR was calculated on the basis of a ratio between a voltage of a reproducing waveform and a voltage obtained from a value obtained by integrating a noise spectrum over the band of 0 kFCI to 600 kFCI. Although a width of the reader used in this assessment was 2.0 μm, it is considered that a width of the reader is about 0.5 μm in a magnetic tape to which the present technology is to be applied. An SNR assessed by the latter reader is calculated to be 6 dB lower than an SNR assessed by the former reader. In the measurement method, or what is called broadband SNR (BB-SNR), an SNR at least required to establish a recording/reproducing system is generally 17 dB, assuming the use at product level. Therefore, in this assessment, "23 dB (=17 dB+6 dB) or more" was determined as a good SNR level.

<PES>

In this assessment, the present inventors used a magnetic tape in which servo signals for detecting tracking positions were written close to an edge as described above. A typical magnetic head reads servo signals on a magnetic tape and moves up and down according to positions of the servo signals so as to align a relative position between the magnetic tape and the magnetic head. In that state, the magnetic head writes information on the magnetic tape or reads information from the magnetic tape. However, in a case where a position of the magnetic tape relative to the magnetic head in a vertical direction changes largely or in a case where the position changes precipitously, it becomes difficult to control tracking of the magnetic tape. Fundamentally, a position gap between the magnetic head and the magnetic tape should be zero, but in reality, there may be a position gap. This position gap of the magnetic tape is called a "PES".

Using an LTO drive (recording track width: 2.9 μm, reproducing track width: 2 μm) in which a servo signal read head was modified for measuring the same tape, a PES was determined from reproducing output variation during recording (recording wavelength 0.21 μm) and reproducing. Each PES was expressed as a relative value, provided that a PES of Comparative Example 1, as a reference medium, was 100%. Note that the present inventors have confirmed that the PES of Comparative Example 1 is equivalent to the ability of a commercially available magnetic tape (linear tape) as of 2017, and considered that it is preferred that the magnetic tape to which the present technology is to be applied should have a PES of 50% or more of the PES of Example 1. Therefore, in this assessment, "50% or less" was determined as a preferable PES.

Table 1 shows configurations of the magnetic tapes of Examples 1 to 12 and Comparative Examples 1 to 9.

TABLE 1

| | Substrate | | Soft magnetic underlayer | | First seed layer | | Second seed layer | | First base layer | | |
|---|---|---|---|---|---|---|---|---|---|---|---|
| | | | | | | | | | | Sputtering | |
| | Material | Thickness (μm) | Material | Average thickness (nm) | Material | Average thickness (nm) | Material | Average thickness (nm) | Material | gas pressure (Pa) | Average thickness (nm) |
| Comparative Example 1 | Aramid | 4.4 | CoZrNb | 0 | TiCr | 5 | NiW | 10 | Ru | 0.5 | 10 |
| Comparative Example 2 | Aramid | 4.4 | CoZrNb | 3 | TiCr | 5 | NiW | 10 | Ru | 0.5 | 10 |
| Comparative Example 3 | Aramid | 4.4 | CoZrNb | 7 | TiCr | 5 | NiW | 10 | Ru | 0.5 | 10 |
| Example 1 | Aramid | 4.4 | CoZrNb | 10 | TiCr | 5 | NiW | 10 | Ru | 0.5 | 10 |
| Example 2 | Aramid | 4.4 | CoZrNb | 30 | TiCr | 5 | NiW | 10 | Ru | 0.5 | 10 |
| Example 3 | Aramid | 4.4 | CoZrNb | 50 | TiCr | 5 | NiW | 10 | Ru | 0.5 | 10 |
| Comparative Example 4 | Aramid | 4.4 | CoZrNb | 60 | TiCr | 5 | NiW | 10 | Ru | 0.5 | 10 |
| Example 4 | Aramid | 4.4 | CoZrNb | 40 | TiCr | 2 | NiW | 3 | Ru | 0.5 | 3 |
| Example 5 | Aramid | 4.4 | CoZrNb | 30 | TiCr | 2 | NiW | 3 | Ru | 0.5 | 8 |
| Example 6 | Aramid | 4.4 | CoZrNb | 20 | TiCr | 5 | NiW | 5 | Ru | 0.5 | 10 |
| Comparative Example 5 | Aramid | 4.4 | CoZrNb | 7 | TiCr | 5 | NiW | 5 | Ru | 0.5 | 10 |
| Comparative Example 6 | Aramid | 4.4 | CoZrNb | 3 | TiCr | 5 | NiW | 5 | Ru | 0.5 | 14 |
| Comparative Example 7 | Aramid | 4.4 | CoZrNb | 0 | TiCr | 5 | NiW | 5 | Ru | 1.5 | 17 |
| Example 7 | Aramid | 4.1 | CoZrNb | 10 | TiCr | 5 | NiW | 10 | Ru | 0.5 | 10 |
| Example 8 | Aramid | 4.7 | CoZrNb | 10 | TiCr | 5 | NiW | 10 | Ru | 0.5 | 10 |
| Example 9 | Aramid | 4.8 | CoZrNb | 10 | TiCr | 5 | NiW | 10 | Ru | 0.5 | 10 |
| Example 10 | Aramid | 5.2 | CoZrNb | 10 | TiCr | 5 | NiW | 10 | Ru | 0.5 | 10 |
| Comparative Example 8 | Aramid | 4.4 | CoZrNb | 7 | CrNiFe | 15 | — | — | CoO | | 28 |
| Example 11 | Aramid | 4.4 | CoZrNb | 10 | CrNiFe | 15 | — | — | CoO | | 28 |
| Comparative Example 9 | PET | 5.3 | CoZrNb | 7 | TiCr | 5 | NiW | 10 | Ru | 0.5 | 10 |
| Example 12 | PET | 5.3 | CoZrNb | 10 | TiCr | 5 | NiW | 10 | Ru | 0.5 | 10 |

| | Second base layer | | | Recording layer | |
|---|---|---|---|---|---|
| | | Sputtering | | | |
| | Material | gas pressure (Pa) | Average thickness (nm) | Material | Average thickness (nm) |
| Comparative Example 1 | Ru | 2 | 20 | CoPtCr—SiO$_2$ | 14 |
| Comparative Example 2 | Ru | 2 | 20 | CoPtCr—SiO$_2$ | 14 |
| Comparative Example 3 | Ru | 2 | 20 | CoPtCr—SiO$_2$ | 14 |
| Example 1 | Ru | 2 | 20 | CoPtCr—SiO$_2$ | 14 |
| Example 2 | Ru | 2 | 20 | CoPtCr—SiO$_2$ | 14 |
| Example 3 | Ru | 2 | 20 | CoPtCr—SiO$_2$ | 14 |
| Comparative Example 4 | Ru | 2 | 20 | CoPtCr—SiO$_2$ | 14 |
| Example 4 | Ru | 2 | 7 | CoPtCr—SiO$_2$ | 14 |
| Example 5 | Ru | 2 | 12 | CoPtCr—SiO$_2$ | 14 |
| Example 6 | Ru | 2 | 15 | CoPtCr—SiO$_2$ | 14 |
| Comparative Example 5 | Ru | 2 | 28 | CoPtCr—SiO$_2$ | 14 |
| Comparative Example 6 | Ru | 2 | 28 | CoPtCr—SiO$_2$ | 14 |
| Comparative Example 7 | Ru | 2 | 28 | CoPtCr—SiO$_2$ | 14 |
| Example 7 | Ru | 2 | 20 | CoPtCr—SiO$_2$ | 14 |
| Example 8 | Ru | 2 | 20 | CoPtCr—SiO$_2$ | 14 |
| Example 9 | Ru | 2 | 20 | CoPtCr—SiO$_2$ | 14 |
| Example 10 | Ru | 2 | 20 | CoPtCr—SiO$_2$ | 14 |

TABLE 1-continued

|  |  |  |  |  |  |  |
|---|---|---|---|---|---|---|
|  | Comparative Example 8 | Ru | 0.5 | 2 | CoPtCr—SiO$_2$ | 14 |
|  | Example 11 | Ru | 0.5 | 2 | CoPtCr—SiO$_2$ | 14 |
|  | Comparative Example 9 | Ru | 2 | 20 | CoPtCr—SiO$_2$ | 14 |
|  | Example 12 | Ru | 2 | 20 | CoPtCr—SiO$_2$ | 14 |

Table 2 shows assessment results of the magnetic tapes of Examples 1 to 12 and Comparative Examples 1 to 9.

TABLE 2

|  | Sum of average thicknesses of metal-containing layers (nm) | Total thickness of magnetic tape (μm) | Young's modulus of film (MD) (GPa) | Young's modulus of tape (MD) (GPa) | Difference in Young's modulus (MD) (GPa) | PES (%) | SNR (dB) |
|---|---|---|---|---|---|---|---|
| Comparative Example 1 | 59 | 4.7 | 11.1 | 13.3 | 2.2 | 100 | 25.5 |
| Comparative Example 2 | 62 | 4.7 | 11.1 | 13.35 | 2.25 | 85 | 25 |
| Comparative Example 3 | 66 | 4.7 | 11.1 | 13.4 | 2.3 | 65 | 25 |
| Example 1 | 69 | 4.7 | 11.1 | 13.5 | 2.4 | 50 | 24.5 |
| Example 2 | 89 | 4.7 | 11.1 | 13.8 | 2.7 | 45 | 24 |
| Example 3 | 109 | 4.7 | 11.1 | 14.3 | 3.2 | 40 | 23 |
| Comparative Example 4 | 119 | 4.7 | 11.1 | 14.5 | 3.4 | 40 | 21 |
| Example 4 | 69 | 4.7 | 11.1 | 13.5 | 2.4 | 50 | 23 |
| Example 5 | 69 | 4.7 | 11.1 | 13.5 | 2.4 | 50 | 23.5 |
| Example 6 | 69 | 4.7 | 11.1 | 13.5 | 2.4 | 50 | 24 |
| Comparative Example 5 | 69 | 4.7 | 11.1 | 13.5 | 2.4 | 65 | 24 |
| Comparative Example 6 | 69 | 4.7 | 11.1 | 13.5 | 2.4 | 65 | 24 |
| Comparative Example 7 | 69 | 4.7 | 11.1 | 13.5 | 2.4 | 80 | 25.5 |
| Example 7 | 69 | 4.4 | 11.1 | 13.5 | 2.4 | 50 | 24.5 |
| Example 8 | 69 | 5 | 11.1 | 13.5 | 2.4 | 50 | 24.5 |
| Example 9 | 69 | 5.1 | 11.1 | 13.5 | 2.4 | 50 | 24.5 |
| Example 10 | 69 | 5.5 | 11.1 | 13.5 | 2.4 | 50 | 24.5 |
| Comparative Example 8 | 94 | 4.7 | 11.1 | 13.4 | 2.3 | 65 | 25 |
| Example 11 | 97 | 4.7 | 11.1 | 13.5 | 2.4 | 50 | 24.5 |
| Comparative Example 9 | 66 | 5.6 | 4.65 | 6.95 | 2.3 | 65 | 25 |
| Example 12 | 69 | 5.6 | 4.65 | 7.05 | 2.4 | 50 | 24.5 |

Figure 4A:
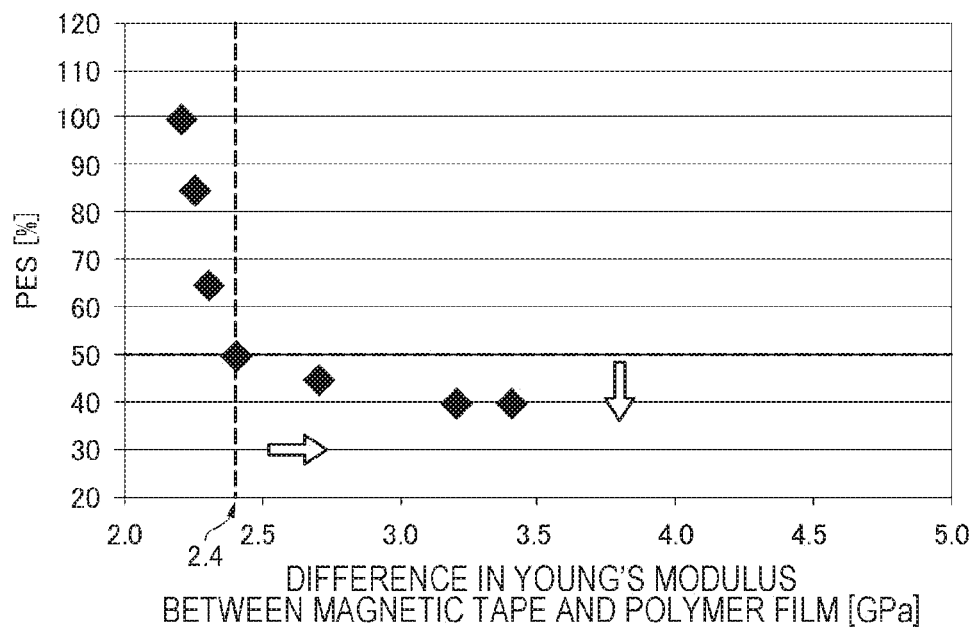
FIG. 4A is a graph showing a relation between a PES and a difference in Young's modulus between a magnetic tape and a polymer film (substrate) in a longitudinal direction of the magnetic tape.
Figure 4B:
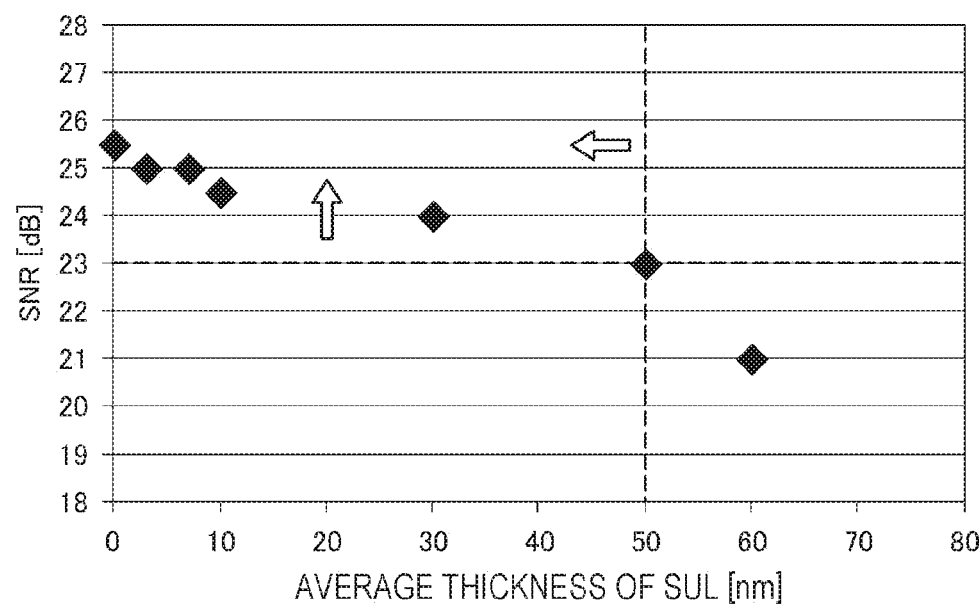
FIG. 4B is a graph showing a relation between an average thickness of a soft magnetic underlayer and an SNR.

FIG. 4A shows a relation between a PES and a difference in Young's modulus between a magnetic tape and a polymer film (substrate) in a longitudinal direction of the magnetic tape. FIG. 4B shows a relation between an average thickness of a soft magnetic underlayer and an SNR. Note that the relationship shown in FIGS. 4A and 4B is related to the magnetic tapes of Examples 1 to 3 and Comparative Examples 1 to 4 in which average thicknesses of the metal-containing layers other than the SUL (that is, the first and second seed layers, the first and second base layers, and the recording layer) are even.

FIG. 4A shows that a PES reduces to 50% or less, if a difference in Young's modulus between the magnetic tape and the polymer film (substrate) in the longitudinal direction of the magnetic tape is 2.4 GPa or more.

FIG. 4B shows that the SUL having an average thickness of 50 nm or less causes the magnetic tape to have an SNR of 23 or more.

Figure 5:
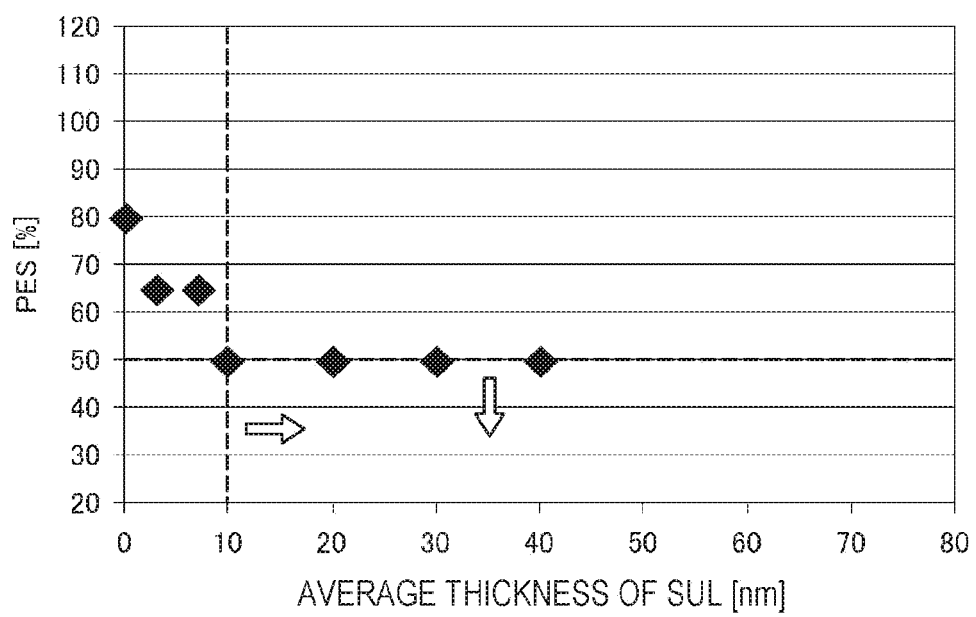
FIG. 5 is a graph showing a relation between an average thickness of the soft magnetic underlayer and a PES.

FIG. 5 shows a relation between an average thickness of a soft magnetic underlayer and a PES. Note that the relation shown in FIG. 5 is related to the magnetic tapes of Examples 1, 4 to 6 and Comparative Examples 5 to 7 in which a difference in Young's modulus between the magnetic tape and the polymer film (substrate) in the longitudinal direction of the magnetic tape is 2.4 GPa.

FIG. 5 shows that the SUL having an average thickness of 10 nm or more leads to a PES of 50% or less.

Although the embodiments, modifications thereof, and Examples of the present technology have been specifically described, the present technology is not limited to the embodiments, modifications thereof, and Examples and may be modified in various ways on the basis of the technical idea of the present technology.

For example, the configurations, methods, processes, shapes, materials, and numerical values mentioned in the embodiments, modifications thereof, and Examples are illustrative only, and as needed, different configurations, methods, processes, shapes, materials, and numerical values may be employed.

Furthermore, the configurations, methods, processes, shapes, materials, and numerical values of the embodiments, modifications thereof, and Examples may be combined with each other within the gist of the present technology.

Furthermore, the present technology may employ the following configuration.

(1)

A magnetic recording medium including:

a substrate which is flexible and elongated;

a soft magnetic layer having an average thickness of 10 nm or more to 50 nm or less; and a recording layer, in which the soft magnetic layer is disposed between the substrate and the recording layer, and a difference in Young's modulus between the magnetic recording medium and the substrate in a longitudinal direction of the substrate is 2.4 GPa or more.

(2)

The magnetic recording medium according to (1), in which the soft magnetic layer contains Co, Zr, and Nb.

(3)

The magnetic recording medium according to (1) or (2), further including:

a seed layer containing Ti and Cr; and a base layer containing Ru, in which the soft magnetic layer, the seed layer, and the base layer are disposed between the substrate and the recording layer, and the soft magnetic layer, the seed layer, and the base layer are provided in this order from the substrate to the recording layer.

(4)

The magnetic recording medium according to (1) or (2), further including:

a first seed layer containing Ti and Cr;

a second seed layer containing Ni and W; and a base layer containing Ru, in which the soft magnetic layer, the first seed layer, the second seed layer, and the base layer are disposed between the substrate and the recording layer, and the soft magnetic layer, the first seed layer, the second seed layer, and the base layer are provided in this order from the substrate to the recording layer.

(5)

The magnetic recording medium according to (1) or (2), further including:

a seed layer containing Cr, Ni, and Fe;

a first base layer containing Co and O; and a second base layer containing Ru, in which the soft magnetic layer, the seed layer, the first base layer, and the second base layer are disposed between the substrate and the recording layer, and the soft magnetic layer, the seed layer, the first base layer, and the second base layer are provided in this order from the substrate to the recording layer.

(6)

The magnetic recording medium according to (5), in which the seed layer has a face-centered cubic lattice structure and a (111) plane of the face-centered cubic lattice structure is preferentially oriented to be parallel to a surface of the substrate, and the first base layer has a column structure in which a ratio of an average atomic concentration of O to an average atomic concentration of Co is 1 or more and which has an average particle diameter of 3 nm or more and 13 nm or less.

(7)

The magnetic recording medium according to (5) or (6), in which the seed layer has a strength ratio of 60 cps/nm or more in X-ray diffraction.

(8)

The magnetic recording medium according to any one of (5) to (7), in which Cr, Ni, and Fe contained in the seed layer have an average composition represented by the following Formula (A):

$$Cr_X(Ni_YFe_{100-Y})_{100-X} \quad (A)$$

(where $10 \leq X \leq 45$ and $60 \leq Y \leq 90$).

(9)

The magnetic recording medium according to any one of (5) to (8), in which the seed layer has an average thickness of 5 nm or more and 40 nm or less.

(10)

The magnetic recording medium according to any one of (5) to (9), in which the first base layer has an average thickness of 10 nm or more and 150 nm or less.

(11)

The magnetic recording medium according to (6), in which the column structure has an inclination angle of 60 degrees or less.

(12)

The magnetic recording medium according to any one of (1) to (11), in which the recording layer is a perpendicular recording layer.

(13)

The magnetic recording medium according to (12), in which the perpendicular recording layer has a granular structure in which particles containing Co, Pt, and Cr are separated by an oxide.

(14)

The magnetic recording medium according to any one of (1) to (13) used in a recording/reproducing device provided with a ring type record head.

(15)

The magnetic recording medium according to any one of (1) to (14), in which a ring type record head is used as a servo signal write head.

REFERENCE SIGNS LIST 10, 30 Magnetic recording medium
11 Substrate
12 Soft magnetic underlayer
13A First seed layer
13B Second seed layer
14A, 32A First base layer
14B, 32B Second base layer
15 Recording layer
16 Protective layer
17 Lubricating layer
18 Back coat layer
20 Sputtering device
21 Deposition chamber
22 Drum
23a to 23f Cathode
24 Delivery reel
25 Take-up reel
26 Exhaust port
27a to 27c, 28a to 28c Guide roller
31 Seed layer

The invention claimed is:

1. A magnetic recording medium comprising:
a substrate which is flexible and elongated;
a soft magnetic layer having an average thickness of 10 nm or more to 50 nm or less; and
a recording layer,
wherein the soft magnetic layer is disposed between the substrate and the recording layer, and wherein a difference in Young's modulus between the magnetic recording medium and the substrate in a longitudinal direction of the substrate is 2.4 GPa or more.

2. The magnetic recording medium according to claim 1, wherein the soft magnetic layer contains Co, Zr, and Nb.

3. The magnetic recording medium according to claim 1, further comprising:
a seed layer containing Ti and Cr; and
a base layer containing Ru,
wherein the soft magnetic layer, the seed layer, and the base layer are disposed between the substrate and the recording layer, and
wherein the soft magnetic layer, the seed layer, and the base layer are provided in an order from the substrate to the recording layer.

4. The magnetic recording medium according to claim 1, further comprising:
a first seed layer containing Ti and Cr;
a second seed layer containing Ni and W; and
a base layer containing Ru,
wherein the soft magnetic layer, the first seed layer, the second seed layer, and the base layer are disposed between the substrate and the recording layer, and
wherein the soft magnetic layer, the first seed layer, the second seed layer, and the base layer are provided in an order from the substrate to the recording layer.

5. The magnetic recording medium according to claim 1, further comprising:
a seed layer containing Cr, Ni, and Fe;
a first base layer containing Co and O; and
a second base layer containing Ru,
wherein the soft magnetic layer, the seed layer, the first base layer, and the second base layer are disposed between the substrate and the recording layer, and
wherein the soft magnetic layer, the seed layer, the first base layer, and the second base layer are provided in an order from the substrate to the recording layer.

6. The magnetic recording medium according to claim 5, wherein the seed layer has a face-centered cubic lattice structure and a (111) plane of the face-centered cubic lattice structure is preferentially oriented to be parallel to a surface of the substrate, and
wherein the first base layer has a column structure in which a ratio of an average atomic concentration of O to an average atomic concentration of Co is 1 or more and which has an average particle diameter of 3 nm or more and 13 nm or less.

7. The magnetic recording medium according to claim 5, wherein the seed layer has a strength ratio of 60 cps/nm or more in X-ray diffraction.

8. The magnetic recording medium according to claim 5, wherein Cr, Ni, and Fe contained in the seed layer have an average composition represented by following Formula (A):

$$Cr_X(Ni_Y Fe_{100-Y})_{100-X} \qquad (A)$$

(where $10 \leq X \leq 45$ and $60 \leq Y \leq 90$).

9. The magnetic recording medium according to claim 5, wherein the seed layer has an average thickness of 5 nm or more and 40 nm or less.

10. The magnetic recording medium according to claim 5, wherein the first base layer has an average thickness of 10 nm or more and 150 nm or less.

11. The magnetic recording medium according to claim 5, wherein the first base layer has a column structure, and
wherein the column structure has an inclination angle of 60 degrees or less.

12. The magnetic recording medium according to claim 1, wherein the recording layer is a perpendicular recording layer.

13. The magnetic recording medium according to claim 12, wherein the perpendicular recording layer has a granular structure in which particles containing Co, Pt, and Cr are separated by an oxide.

14. The magnetic recording medium according to claim 1, wherein the magnetic recording medium is implemented in a recording/reproducing device provided with a ring type record head.

15. The magnetic recording medium according to claim 14, wherein the ring type record head is implemented as a servo signal write head.

* * * * *